(12) United States Patent
Bachar et al.

(10) Patent No.: US 8,886,908 B2
(45) Date of Patent: Nov. 11, 2014

(54) MANAGEMENT OF MULTIPLE CAPACITY TYPES IN STORAGE SYSTEMS

(75) Inventors: Yariv Bachar, Kibbutz Ma'abarot (IL); Johnny David, Tel Aviv (IL); Asaf Levy, Rishon Le Zion (IL); Elez Shenhar, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 13/489,395

(22) Filed: Jun. 5, 2012
(Under 37 CFR 1.47)

(65) Prior Publication Data
US 2013/0326176 A1  Dec. 5, 2013

(51) Int. Cl.
*G06F 12/02* (2006.01)

(52) U.S. Cl.
CPC .................................... *G06F 12/02* (2013.01)
USPC ......................................................... 711/166

(58) Field of Classification Search
CPC ...................................................... G06F 12/02
See application file for complete search history.

(56) References Cited

U.S. PATENT DOCUMENTS

| 6,460,054 | B1 | 10/2002 | Grummon |
| 7,424,498 | B1 | 9/2008 | Patterson |
| 7,493,442 | B2 * | 2/2009 | Wong et al. .................... 711/103 |
| 7,693,877 | B1 | 4/2010 | Zasman |
| 8,112,661 | B1 | 2/2012 | La France et al. |
| 2007/0179981 | A1 | 8/2007 | Vincent |
| 2012/0042114 | A1 * | 2/2012 | Young et al. ................... 710/316 |
| 2012/0124013 | A1 * | 5/2012 | Provenzano .................. 707/692 |

* cited by examiner

*Primary Examiner* — Hiep Nguyen
(74) *Attorney, Agent, or Firm* — Griffiths & Seaton PLLC

(57) ABSTRACT

A management of capacity types with different consumption policies for an object in a computing storage system is performed by updating a reference type bitmap in a segment-fragment table containing segments that reference fragments upon the creation of a segment for an object. A reference is created in an object-segment reference table, between the object and the segment, in compliance with a consumption policy upon the creation of one of the segments for the object. The reference types that reference the segment are removed upon deletion of the segment.

24 Claims, 6 Drawing Sheets

MANAGEMENT OF MULTIPLE CAPACITY TYPES IN STORAGE SYSTEMS

BACKGROUND OF THE INVENTION

1. Field of the Invention

The present invention relates generally to computers, and more particularly, to management of multiple capacity types in storage systems.

2. Description of the Related Art

In today's society, computer systems are commonplace. Computer systems may be found in the workplace, at home, or at school. Computer systems may include data storage systems, or disk storage systems, to process and store data. Given the increasing size of data storage systems, a need is required for increased efficiency in keeping track of the space consumed by the data.

SUMMARY OF THE INVENTION

Capacity management in storage systems is the task of keeping track of space consumed by existing objects. In order for a storage system to provide increased efficiency and productivity in capacity management, a capacity management scheme should support multiple capacity-type objects.

Accordingly, and in view of the foregoing, various exemplary method, system, and computer program product embodiments for management of capacity types with different consumption policies for an object in a computing storage system are provided. In one embodiment, by way of example only, a reference type bitmap in a segment-fragment reference table containing segments that reference fragments is updated upon the creation of a segment for an object. A reference is created in an object-segment reference table, between the object and the segment, in compliance with a consumption policy upon the creation of the segment for the object. The reference types that reference the segment are removed upon deletion of the segment.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
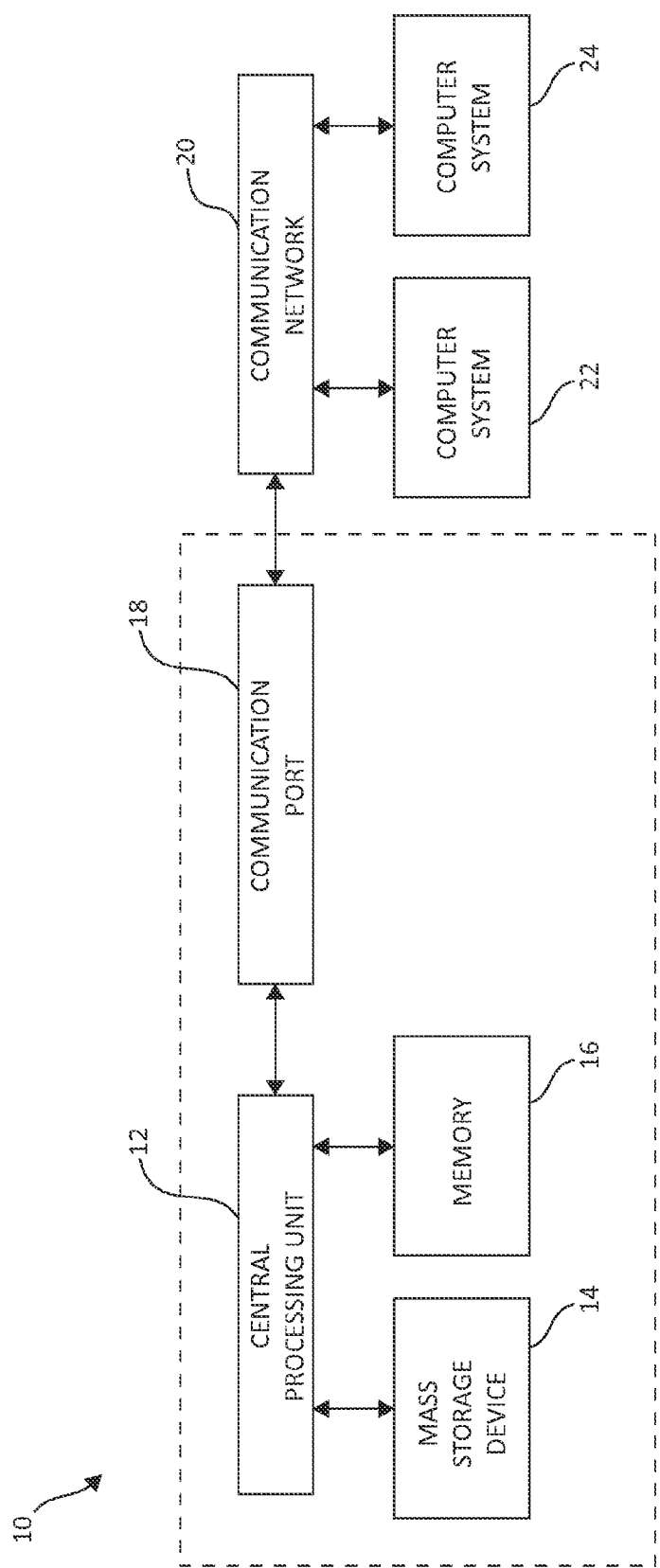
FIG. 1 is a block diagram illustrating a computing system environment having an example storage device in which aspects of the present invention may be realized.

As mentioned previously, capacity management in storage systems is the task of keeping track of space consumed by existing objects. In the illustrated embodiments described below for the capacity management, there are at least two types of objects: 1) backup objects and 2) cloned objects. There may also be at least two types of capacity types: 1) backup capacity and 2) clone capacity. An object may create references to smaller subunits called segments. There may be at least two types of references that are corresponding to the object types: 1) backup references and 2) clone references. An existing object may only create references of the same type as the capacity type of the object. A segment may be referenced by more than one object. Segments may hold references to the smallest subunits called fragments. Fragments may be referenced by more than one segment. Each fragment's size is constant after the fragments creation.

Clone type objects are always created as copies of existing objects. In other words, each cloned object holds references to the same segments as a corresponding existing object, except for the reference type. The cloned object holds clone type references to the segments. A large number of objects may be cloned in a single operation and handling the task of cloning objects requires efficiency in terms of complexity. It should be noted the by use of the term "large number of objects," it is the intention to express, by way of example, that a clone operation may be a multi-object operation (e.g., bulk clone operation) performed with a few hundreds of thousands of objects and/or also performed with at least a million objects.

In the illustrated embodiment, each capacity type has a different consumption policy/rule. Backup type capacity is consumed during the creation of a reference from a segment to a fragment, but each fragment can only consume the backup type capacity once. It should be noted that adding a reference from a backup segment to a fragment, already referenced by some other backup segment, will not consume additional capacity (e.g., this can happen when deduplicating multiple instances of the same data by creating multiple references to the same fragment). Clone type capacity is consumed for each reference. It should be noted that adding a reference from a clone object to a segment will always consume capacity, regardless of the number of objects already referencing the segment or the objects' capacity types. The requirements for different capacity consumption policies, for references that are created, are based upon the following. 1) Multiple references of a backup type are created in the context of internal operations within the system, so it is not desirable to reflect them to the system user in the form of consumed capacity. 2) References of a clone type are created when cloning objects, which is an operation that is explicitly requested by the system user and may reflect each clone operation in consumed capacity, which is reported to the system user.

The illustrated embodiments also provide for redeeming consumed capacity when deleting objects and removing references. The procedure for redeeming capacity fully complements the consumption procedure in order to allow the correct capacity level to be known at all times, and to assure that unreferenced segments and fragments are deleted.

Thus, based upon the foregoing, the following requirements are needed for managing multiple capacity types in storage systems. (1) The capacity for objects is managed according to the objects' capacity types. (2) Clone operations must be efficient in terms of meta-data space consumption. (3) The ability to dynamically change the object-segment and segment-fragment reference types of existing objects and segments, respectively, is possible. (4) The ability to create new objects composed of existing ones is possible. (5) The redemption of capacity under multi-referential meta-data of varied typed capacities is allowed.

Thus, to address these requirements, each object is defined by an object identification (OID) and a capacity type (e.g., either backup type capacity or clone type capacity). Each object holds a dynamic set of reference types to the segments. Each segment is defined by a segment identification (SID) and a constant set of references to the fragments, where each segment-fragment reference is defined by the SID, a fragment identification (FID), a fragment size, and a dynamic reference-type-bitmap.

A new segment is created as either empty, holds no references to fragments upon the segments inception, or non-empty, if it is based on an existing segment. The reference-type-bitmap, for the set of segment-fragment references, is then updated with the new reference type. The object for which the segment was created will then create a reference to the newly created segment. Thus, the process abides by the same consumption rules, as described above. In other words, the consumption policies state that only the first backup type reference to a fragment will consume capacity, and every clone type reference to a segment will consume capacity.

When a segment is deleted, the segment's references are removed. When a clone type reference to a segment is removed, the capacity of the total size of the fragments being referenced is redeemed. When a backup type reference is removed, if no other segment has a backup reference to that fragment, the backup type capacity consumed by the fragment is redeemed and the reference information is updated to indicate that this fragment no longer consumes backup capacity. In any case, when removing the last reference to a fragment, the fragment is deleted. It should be noted that the reference information is kept in two tables (as will be described below): 1) An Object-Segment Reference Table and 2) A Segment-Fragment Reference Table. When creating a backup reference to a fragment, the reference type bitmap allows for determining (and/or inferring) whether a backup capacity should be reserved (i.e. when the backup reference is the first backup reference to the fragment). The bitmap enables efficient segment-fragment reference removal (i.e. when the bitmap is fully unset). Each newly created segment receives a unique SID, except for when the newly created segment is of the clone type, in which case a new entry will be created in the segment-fragment reference table, to indicate the new reference from the cloned object to the segment.

Hence, the illustrated embodiments enable to achieve an efficient implementation of capacity management in a storage system with multiple capacity types, satisfying the comprehensive set of the following requirements. (1) The combination of the capacity type to object-segment references and the capacity type bitmap to segment-fragment references enables capacity management for objects according to their capacity types. (2) Clone operations do not create new rows in the segment-fragment reference table, thus achieving efficiency in terms of meta-data space consumption. (3) Dynamically changing the type, of any reference, can be performed by creation of a new reference, followed by deletion of the old reference. The structure of the reference information tables enables trivial unification of these two procedures. (4) The creation of a new object, which is a composition of existing segments, is done by simply adding references to the segments from the object and following the consumption rules of the reference types. (5) Since the procedures for creation and deletion of references are symmetric, a system-wide symmetric capacity management is achieved. In other words, given initial capacity consumption, creation of multiple objects with mixed reference types, followed by the objects' deletion, will result in capacity consumption of the initial level.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and 22 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24 and 22. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
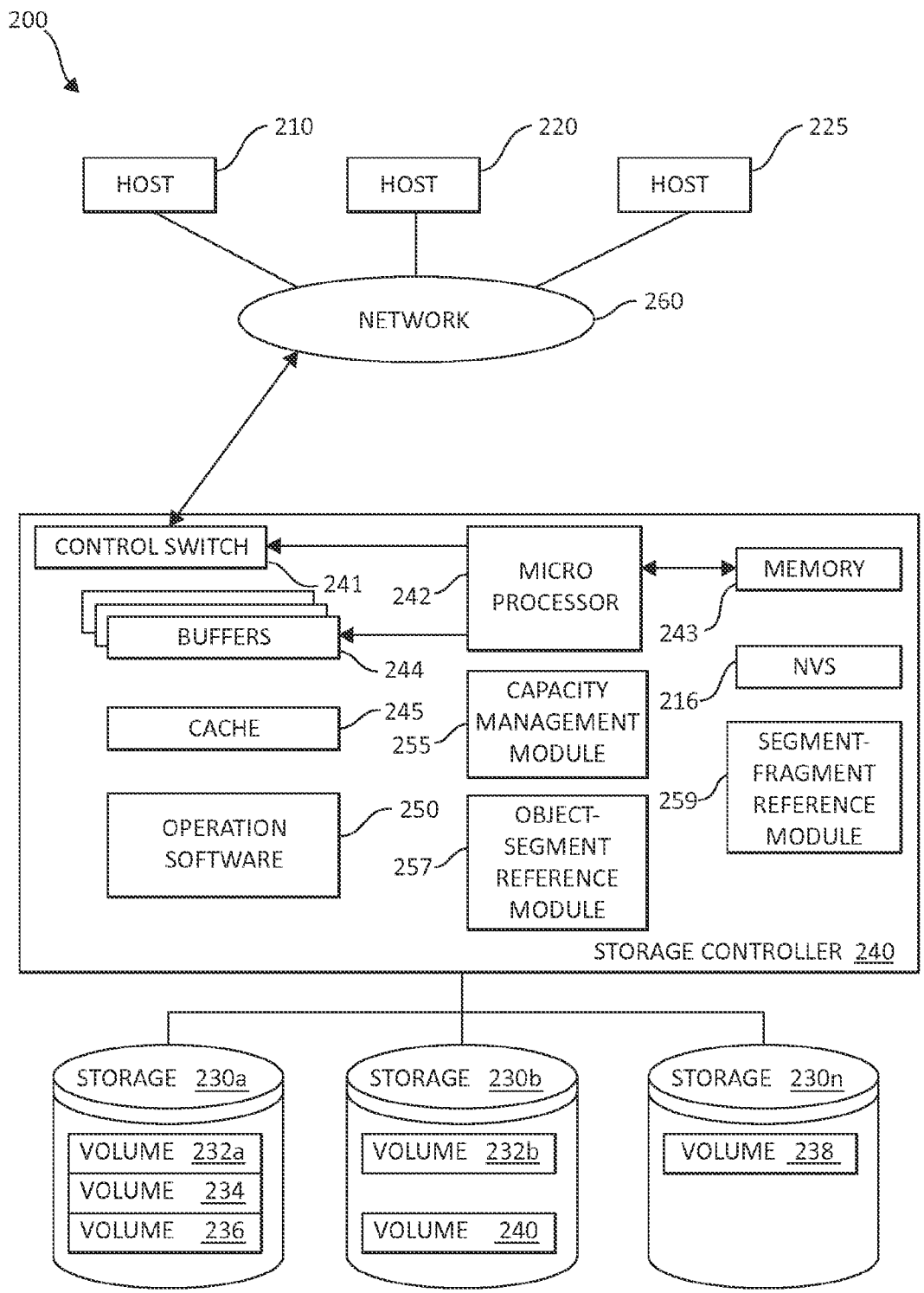
FIG. 2 is a block diagram illustrating a hardware structure of an exemplary data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a capacity management module 255, object-segment (e.g., object to segment) reference module 257, and a segment-fragment (e.g., segment to fragment) reference module 259. The capacity management module 255, the object-segment reference module 257, and the segment-fragment reference module 259 may work in conjunction with each and every component of the storage controller 240, the hosts 210, 220, 225, and storage devices 230. The capacity management module 255, the object-segment reference module 257, and the segment-fragment reference module 259 may be structurally one complete module or may be associated and/or included with other individual modules. The capacity management module 255, the object-segment reference module 257, and the segment-fragment reference module 259 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, capacity management module 255, the object-segment reference module 257, and the segment-fragment reference module 259, in which information may be set. Multiple buffers 244 may be implemented with the present invention to assist with the operations as described herein. In one embodiment, the cluster hosts/nodes, 210, 220, 225 and the storage controller 240 are connected through a network (this could be a fibre channel) 260 as an interface i.e., via at least one switch called "fabric."

In one embodiment, the host computers or one or more physical or virtual devices, 210, 220, 225 and the storage controller 240 are connected through a network (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, capacity management module 255, the object-segment reference module 257, and the segment-fragment reference module 259 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

As mentioned above, the capacity management module 255, the object-segment reference module 257, and the segment-fragment reference module 259 may also be located in the cache 245 or other components. As such, one or more capacity management module 255, the object-segment reference module 257, and the segment-fragment reference module 259 maybe used as needed, based upon the storage architecture and users preferences.

Figure 3:
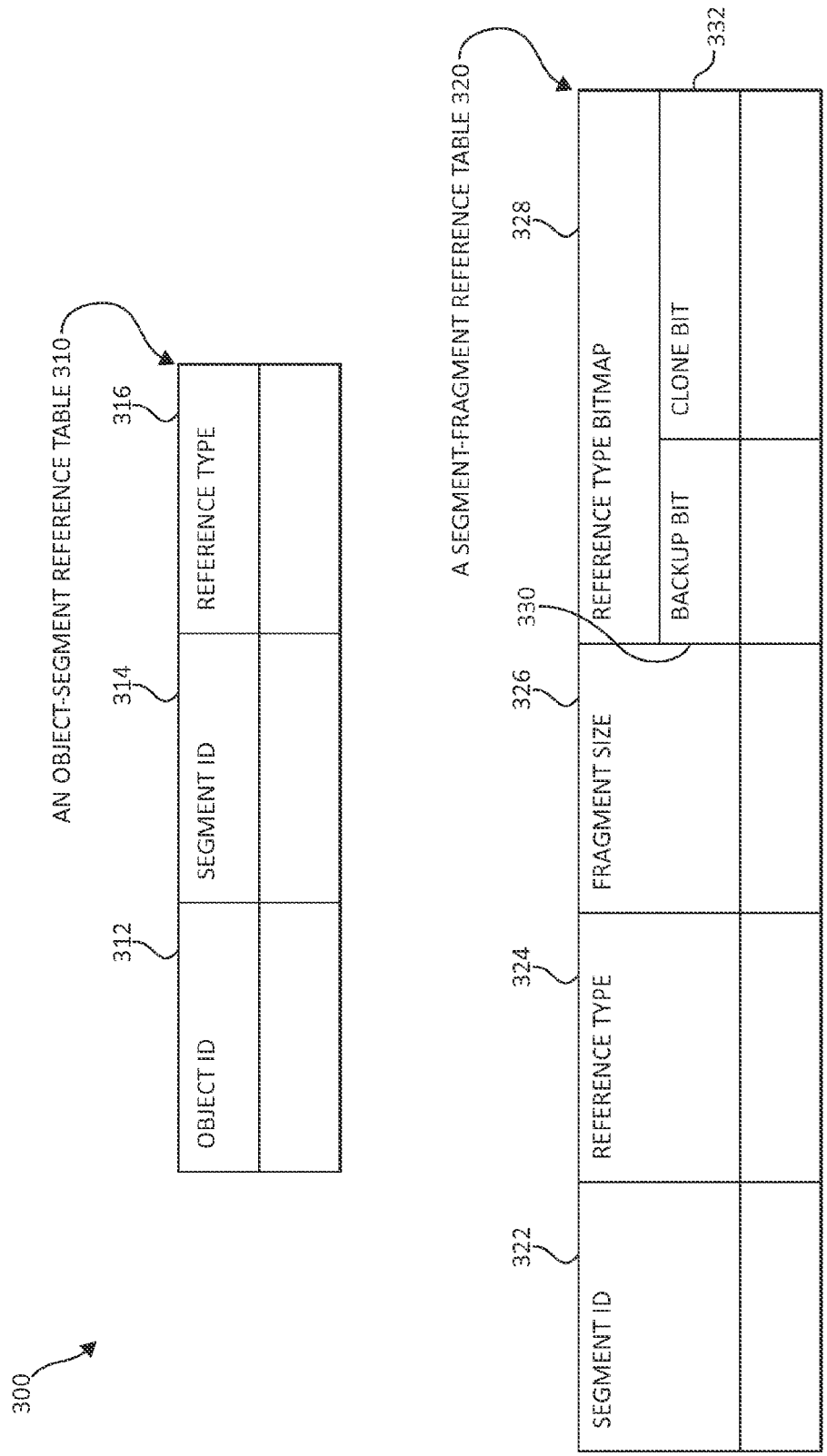
FIG. 3 is a block diagram illustrating an exemplary object-segment reference table and an exemplary segment-fragment reference table.

Turning now to FIG. 3, a block diagram 300 illustrating an exemplary object-segment reference table and an exemplary segment-fragment reference table is depicted. As mentioned above, the reference information is kept in two tables: 1) An Object-Segment Reference Table 310, and 2) A Segment-Fragment Reference Table 320. The object-segment reference table 310 includes entries for the object identification (OID) 312, entries for the segment identification (SID) 314, and the reference type 316. The segment-fragment reference table 320 includes entries for the segment identification (SID) 322, reference type 324, the fragment size 326, and the reference type bitmap 328, which includes the backup bit 330 and the clone bit 332.

Each entry in the object-segment reference table 310 describes a single reference of an object to a segment (e.g., OID:SID:Type). Each entry in the Segment-Fragment Reference Table 320 describes the types of references that exist from a single segment to a single fragment (e.g., SID:FID: TypeBitmap). As mentioned previously, when creating a backup reference to a fragment, the reference type bitmap 328 allows for determining (and/or inferring) whether a backup capacity should be reserved (i.e. when the backup reference is the first backup reference to the fragment). The bitmap 328 enables efficient segment-fragment reference removal (i.e. when the bitmap is fully unset). Each newly created segment receives a unique SID 322, except for when the newly created segment is of the clone type, in which case a new entry will be created in the segment-fragment reference table 320, to indicate the new reference from the cloned object to the segment.

Figure 4:
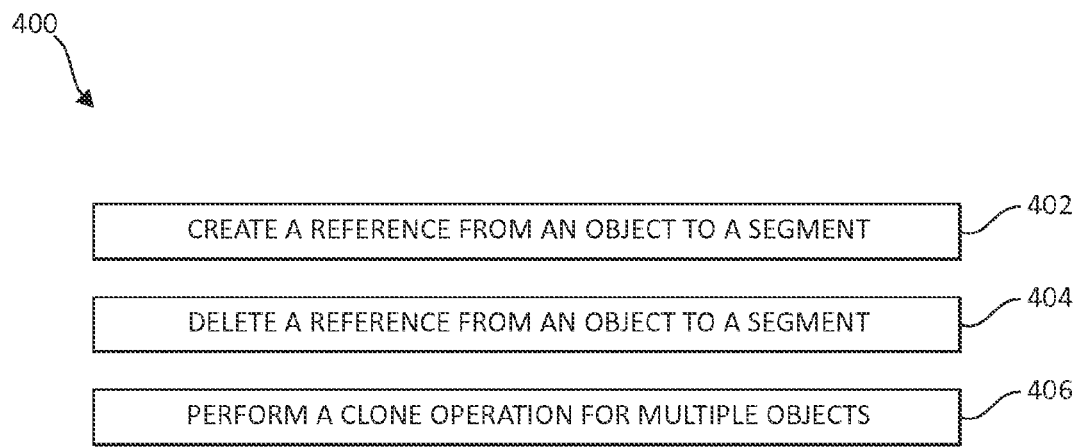
FIG. 4 is a block diagram illustrating exemplary operations for management of capacity types with different consumption policies for an object in a computing storage system.

Turning now to FIG. 4, a block diagram illustrating exemplary operations for management of capacity types with different consumption policies for an object in a computing storage system. A reference is created from an object to a segment 402. A reference type bitmap is updated in a segment-fragment reference table containing segments that reference fragments upon the creation of one of the segments for an object. A reference is created in an object-segment reference table between the object and one of the segments in compliance with one of the different consumption policies upon the creation of one of the segments for the object. The reference from the object to a segment may be deleted 404. The reference types that reference one of the segments are removed upon deletion. A clone operation may be performed for multiplying objects 406.

Figure 5:
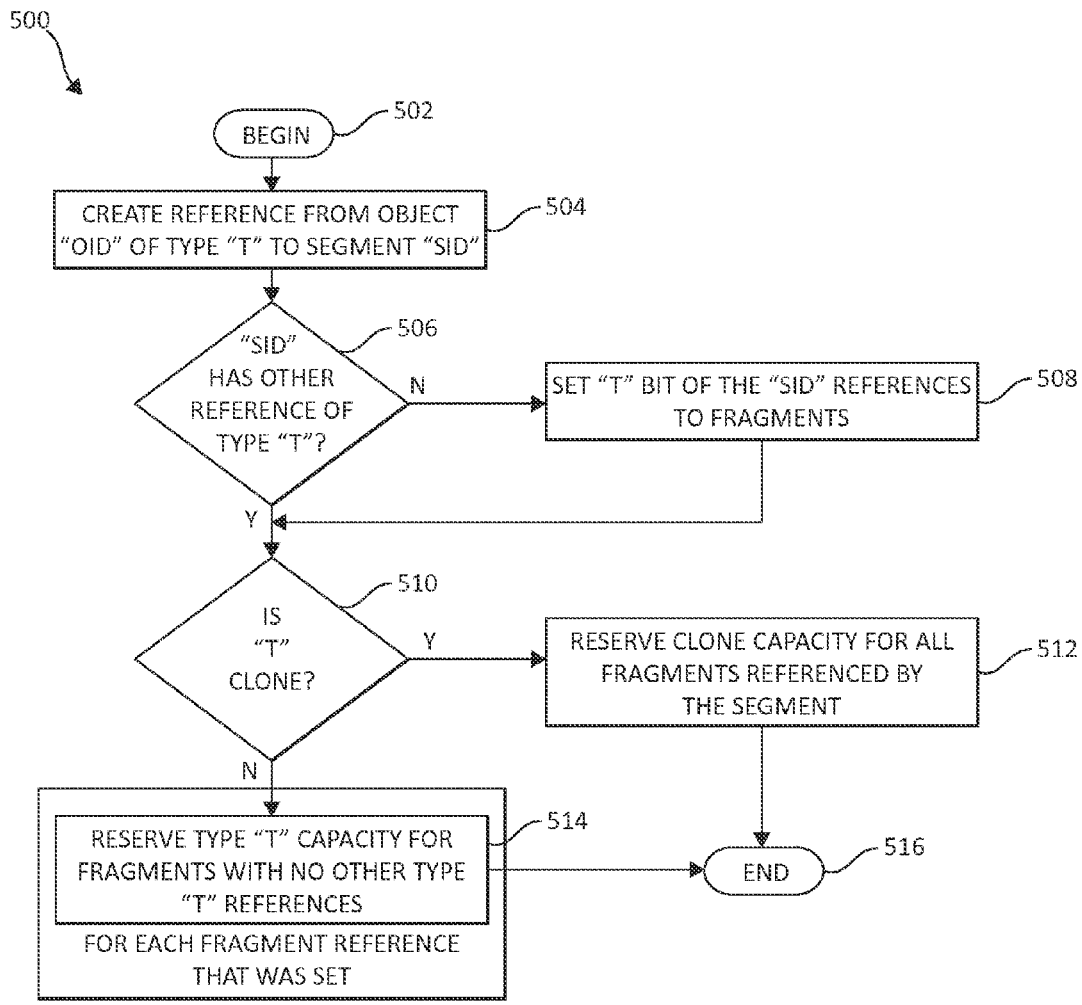
FIG. 5 is a flow chart diagram illustrating an exemplary method for creating a reference from an object to a segment.

Turning to FIG. 5, a flowchart illustrating an exemplary method 500 for creating a reference from an object to a segment is depicted. The method 500 creates an entry in the object-segment reference table with the requested OID, SID, and the type 'T' (step 504). The method 500 determines if another object has a type 'T' reference to the 'SID' (step 506). If no other object has a type 'T' reference to the SID, the method 500 may use the segment-fragment reference table to go over the fragments referenced by the SID. For each such entry, if the 'T' bit in the reference type bitmap is reset the method 500 may set the 'T' type bit (step 508). The method 500 determines if the reference type 'T' is a clone type (step 510). Based on the reference type 'T', if the reference type 'T' is the clone type reference, the method 500 may reserve clone type capacity for all the fragments referenced by the segment (i.e. report this capacity as "used") (step 512). If the reference type 'T' is not the clone type reference, the method 500 may go over (traverse) the fragments in the entries in which the 'T' bit was set, and for each such fragment, if no other type 'T' reference to the fragments exists, the method 500 may reserve capacity type 'T' for the fragments (step 514). The method ends (step 516).

As mentioned above, the procedure for redeeming capacity fully complements the consumption procedure in order to allow the correct capacity level to be known at all times, and to assure that unreferenced segments and fragments are deleted. Thus, the illustrated embodiments, described below, provide for redeeming consumed capacity when deleting objects and removing references.

Figure 6:
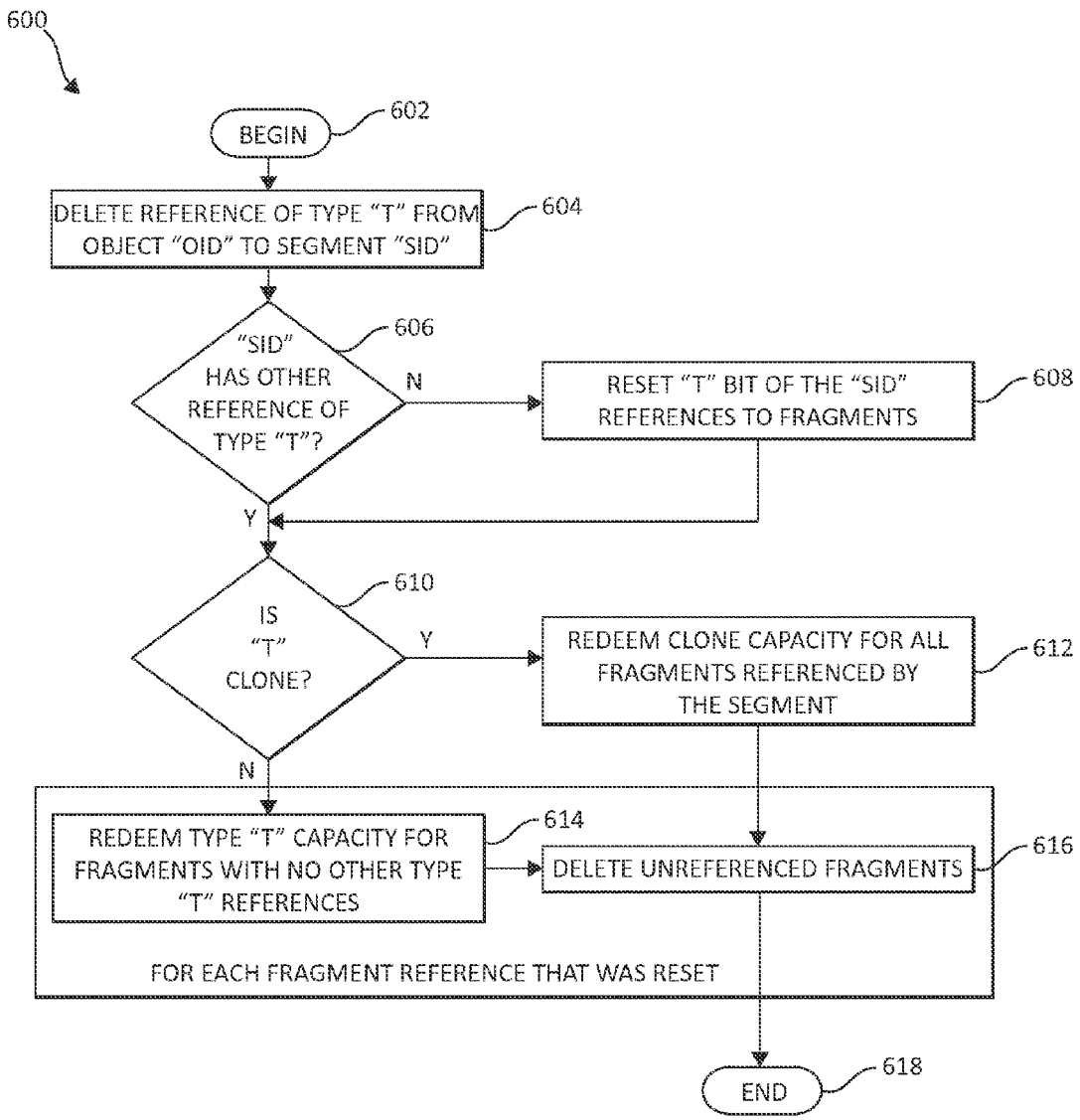
FIG. 6 is a flow chart diagram illustrating an exemplary method for deleting a reference from an object to a segment.

Turning now to FIG. 6, a flowchart illustrating an exemplary method 600 for deleting a reference from an object to a segment is depicted. The method 600 begins (step 602) and finds the entry in the object-segment reference table marking the reference of OID to SID. The method 600 deletes the entry in the object-segment reference table with the requested OID, SID, and the type 'T' (step 604). The method 600 determines if another object has type 'T' reference to 'SID' (step 606). If no other object has type 'T' reference to 'SID', the method 600 may use the segment-fragment reference table to go over the fragments referenced by 'SID'. For each such entry, if the reference type 'T' bit in the reference type bitmap is set, the method 600 may reset the reference type 'T' bit (step 608). The method 600 determines if the reference type 'T' is a clone type (step 610). Based on the reference type 'T', if the reference type 'T' is the clone type reference, the method 600 may redeem the clone type capacity for all the fragments referenced by the segment (i.e. report this capacity as "free") (step 612). If the reference type 'T' is not the clone type reference, the method 600 may go over (e.g., traverse) the fragments in the entries in which the reference type 'T' bit was reset, and for each such fragment, if no other reference type 'T' reference to the fragments exists, the method 600 may redeem capacity for the fragments (step 614). The method 600 deletes unreferenced fragments (step 616). The method ends (step 618).

It should be noted that the illustrated embodiments may be applicable to several types of applications. For example, in one application in storage systems, is to use the reported capacity to display the breakdown of consumed capacity by types. Another possible application for the illustrated embodiments is in a multi-quota enforcement environment. The illustrated embodiments may be used to enforce capacity in a multiple-capacity-types storage system, where a different quota is set for each capacity type. Yet another application is in file-systems capacity management, or capacity management of any equivalent storage unit, where the total physical storage space is divided by any type of partitions. The illustrated embodiments are expandable, meaning the illustrated embodiments may be used with any number of different capacity types. Each capacity type may be equivalent to a partition. The illustrated embodiments may be used to enforce the capacity of each partition individually, which could enable virtually instantaneous movement of objects between partitions—by simply switching capacity types. Thus, the illustrated embodiments can also lead to virtually instantaneous resizing of partitions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

The invention claimed is:

1. A method for management of capacity types with different consumption policies for an object in a computing storage system using a processor device, comprising:
    updating a reference type bitmap in a segment-fragment reference table, containing a plurality of segments that reference fragments, upon the creation of one of the plurality of segments for an object;
    creating a reference in an object-segment reference table, between the object and the one of the plurality of segments, in compliance with one of the different consumption policies upon the creation of the one of the plurality of segments for the object; and
    removing the plurality of reference types that reference the one of the plurality of segments upon deletion of one of the plurality of segments.

2. The method of claim 1, further including performing at least one of:

defining the object by an object identification (OID) and one of the capacity types, wherein the capacity types include at least one of a backup type capacity and a clone type capacity, and the plurality of reference types include at least one of a clone type reference and a backup type reference, defining the one of the plurality of segments by a segment identification (SID) and the plurality of segments referencing the fragments, and defining the one of the plurality of segments referencing the fragments by the SID, a fragment identification (FID), a fragment size, and the reference type bitmap.

3. The method of claim 2, further including applying one of the different consumption policies by consuming capacity for only a first reference in the segment-fragment reference table between the one of the plurality of segments with the backup type reference to one of the fragments.

4. The method of claim 2, further including, upon deletion of the one of the plurality of segments, performing at least one of:
   if the clone type reference to the one of the plurality of segments is removed, redeeming a capacity of a total size of the fragments referenced by the one of the plurality of segments, and
   if the backup type reference is removed and no other one of the plurality of segments reference has the backup type reference to the fragments, redeeming the backup type capacity consumed by the fragments, wherein reference information is updated to indicate the fragments no longer consume the backup type capacity, and
   deleting the fragments upon removing a last one of the plurality of reference types for any one of the plurality of reference types.

5. The method of claim 2, further including assigning the SID to the one of the plurality of segments upon the creation of one of the plurality of segments for an object.

6. The method of claim 2, further including, in conjunction with the creating the reference in the object-segment reference table between the object and the one of the plurality of segments, performing at least one of:
   creating an entry in the object-segment reference table with the SID, the OID, and one of the plurality of reference types,
   traversing the segment-fragment reference table for the fragments referenced by the SID if there are no other alternative object having the reference to the one of the plurality of reference types, wherein a bit is set in the reference type bitmap if the bit for the one of the plurality of reference types is reset,
   if the one of the plurality of reference types is the clone type reference, reserving the clone type capacity for each of the fragments that is referenced by the one of the plurality of segments, and
   if the one of the plurality of reference types is not the clone type reference, traversing over the fragments in entries of the segment-fragment reference table having the bit set for the one of the plurality of reference types,
      wherein if there are no other references from the one of the plurality of reference types, the one of the capacity types for the fragments is reserved if there are no other alternative one of the plurality of segments having the one of the plurality of reference types.

7. The method of claim 2, further including, in conjunction with deleting the reference in the object-segment reference table between the object and the one of the plurality of segments, performing at least one of:

finding an entry in the object-segment reference table which marks the reference of the OID to the SID,
retrieving one of the plurality of reference types from the entry of the one of the plurality of reference types,
deleting the entry in the object-segment reference table having the OID, the SID, and the one of the plurality of reference types,
traversing the segment-fragment reference table for the fragments referenced by the SID if there are no other alternative objects having the reference to the one of the plurality of reference types, wherein a bit is reset in the reference type bitmap if the bit for the one of the plurality of reference types is set,
   if the one of the plurality of reference types is the clone type reference, redeeming the clone type capacity for each of the fragments that is referenced by the one of the plurality of segments, and
   if the one of the plurality of reference types is not the clone type reference, traversing over the fragments in entries of the segment-fragment reference table having the bit set for the one of the plurality of reference types,
      wherein if there are no other references from the one of the plurality of reference types, the one of the capacity types for the fragments is redeemed if there are no other alternative one of the plurality of segments having the one of the plurality of reference types, and
for the entries in the segment-fragment reference table having bits in the reference type bitmap reset:
   retrieving the FID,
   searching for alternative references to the FID,
   deleting the fragments that do not have any of the alternative references, and
   deleting the entries.

8. The method of claim 2 further including, performing a clone operation for a plurality of objects by the following:
   generating a first list of the OID that identify existing ones of the plurality of objects for which to perform the clone operation and a second list corresponding to destination object identifications for the plurality of objects that will become cloned objects, and
   for each of the plurality of objects, traversing references in the object-segment table, wherein the OID is the corresponding destination object ID and the plurality of reference types for each of the plurality of objects is indicated as the clone type reference.

9. A system for management of capacity types with different consumption policies for an object in a computing storage system, comprising:
   a processor device operable in the computing environment, wherein the processor device is adapted for:
      updating a reference type bitmap in a segment-fragment reference table, containing a plurality of segments that reference fragments, upon the creation of one of the plurality of segments for an object,
      creating a reference in an object-segment reference table, between the object and the one of the plurality of segments, in compliance with one of the different consumption policies upon the creation of the one of the plurality of segments for the object, and
      removing the plurality of reference types that reference the one of the plurality of segments upon deletion of one of the plurality of segments.

10. The system of claim 9, wherein the processor is further configured for performing at least one of:

defining the object by an object identification (OID) and one of the capacity types, wherein the capacity types include at least one of a backup type capacity and a clone type capacity, and the plurality of reference types include at least one of a clone type reference and a backup type reference, defining the one of the plurality of segments by a segment identification (SID) and the plurality of segments referencing the fragments, and defining the one of the plurality of segments referencing the fragments by the SID, a fragment identification (FID), a fragment size, and the reference type bitmap.

11. The system of claim 10, wherein the processor is further configured for applying one of the different consumption policies by consuming capacity for only a first reference in the segment-fragment reference table between the one of the plurality of segments with the backup type reference to one of the fragments.

12. The system of claim 10, wherein the processor, upon deletion of the one of the plurality of segments, further configured for performing one of:

if the clone type reference to the one of the plurality of segments is removed, redeeming a capacity of a total size of the fragments referenced by the one of the plurality of segments, and if the backup type reference is removed and no other one of the plurality of segments reference has the backup type reference to the fragments, redeeming the backup type capacity consumed by the fragments, wherein reference information is updated to indicate the fragments no longer consume the backup type capacity, and deleting the fragments upon removing a last one of the plurality of reference types for any one of the plurality of reference types.

13. The system of claim 10, wherein the processor is further configured for assigning the SID to the one of the plurality of segments upon the creation of one of the plurality of segments for an object.

14. The system of claim 10, wherein the processor device, in conjunction with the creating the reference in the object-segment reference table between the object and the one of the plurality of segments, is further configured for performing at least one of:

creating an entry in the object-segment reference table with the SID, the OID, and one of the plurality of reference types, traversing the segment-fragment reference table for the fragments referenced by the SID if there are no other alternative objects having the reference to the one of the plurality of reference types, wherein a bit is set in the reference type bitmap if the bit for the one of the plurality of reference types is reset, if the one of the plurality of reference types is the clone type reference, reserving the clone type capacity for each of the fragments that is referenced by the one of the plurality of segments, and if the one of the plurality of reference types is not the clone type reference, traversing over the fragments in entries of the segment-fragment reference table having the bit set for the one of the plurality of reference types, wherein if there are no other references from the one of the plurality of reference types, the one of the capacity types for the fragments is reserved if there are no other alternative one of the plurality of segments having the one of the plurality of reference types.

15. The system of claim 10, wherein the processor device, in conjunction with deleting the reference in the object-segment reference table between the object and the one of the plurality of segments, is further configured for performing at least one of:

finding an entry in the object-segment reference table which marks the reference of the OID to the SID, retrieving one of the plurality of reference types from the entry of the one of the plurality of reference types, deleting the entry in the object-segment reference table having the OID, the SID, and the one of the plurality of reference types, traversing the segment-fragment reference table for the fragments referenced by the SID if there are no other alternative objects having the reference to the one of the plurality of reference types, wherein a bit is reset in the reference type bitmap if the bit for the one of the plurality of reference types is set, if the one of the plurality of reference types is the clone type reference, redeeming the clone type capacity for each of the fragments that is referenced by the one of the plurality of segments, and if the one of the plurality of reference types is not the clone type reference, traversing over the fragments in entries of the segment-fragment reference table having the bit set for the one of the plurality of reference types, wherein if there are no other references from the one of the plurality of reference types, the one of the capacity types for the fragments is redeemed if there are no other alternative one of the plurality of segments having the one of the plurality of reference types, and for the entries in the segment-fragment reference table having bits in the reference type bitmap reset:

retrieving the FID, searching for alternative references to the FID, deleting the fragments that do not have any of the alternative references, and deleting the entries.

16. The system of claim 10, wherein the processor is further configured for performing a clone operation for a plurality of objects by at least one of:

generating a first list of the OID that identify existing ones of the plurality of objects for which to perform the clone operation and a second list corresponding to destination object identifications for the plurality of objects that will become cloned objects, and for each of the plurality of objects, traversing references in the object-segment table, wherein the OID is the corresponding destination object ID and the plurality of reference types for each of the plurality of objects is indicated as the clone type reference.

17. A computer program product for management of capacity types with different consumption policies for an object in a computing storage system using a processor device, the computer program product comprising a computer-readable storage medium having computer-readable program code portions stored therein, the computer-readable program code portions comprising:

a first executable portion for updating a reference type bitmap in a segment-fragment reference table, containing a plurality of segments that reference fragments, upon the creation of one of the plurality of segments for an object;

a second executable portion for creating a reference in an object-segment reference table, between the object and the one of the plurality of segments, in compliance with one of the different consumption policies upon the creation of the one of the plurality of segments for the object; and a third executable portion for removing the plurality of reference types that reference the one of the plurality of segments upon deletion of one of the plurality of segments.

18. The computer program product of claim 17, further including a third executable portion for performing at least one of:

defining the object by an object identification (OID) and one of the capacity types, wherein the capacity types include at least one of a backup type capacity and a clone type capacity, and the plurality of reference types include at least one of a clone type reference and a backup type reference, defining the one of the plurality of segments by a segment identification (SID) and the plurality of segments referencing the fragments, and defining the one of the plurality of segments referencing the fragments by the SID, a fragment identification (FID), a fragment size, and the reference type bitmap.

19. The computer program product of claim 18, further including a fourth executable portion for applying one of the different consumption policies by consuming capacity for only a first reference in the segment-fragment reference table between the one of the plurality of segments with the backup type reference to one of the fragments.

20. The computer program product of claim 18, further including a fourth executable portion for, upon deletion of the one of the plurality of segments, performing one of:

if the clone type reference to the one of the plurality of segments is removed, redeeming a capacity of a total size of the fragments referenced by the one of the plurality of segments, and if the backup type reference is removed and no other one of the plurality of segments reference has the backup type reference to the fragments, redeeming the backup type capacity consumed by the fragments, wherein reference information is updated to indicate the fragments no longer consume the backup type capacity, and deleting the fragments upon removing a last one of the plurality of reference types for any one of the plurality of reference types.

21. The computer program product of claim 18, further including a fourth executable portion for performing assigning the SID to the one of the plurality of segments upon the creation of one of the plurality of segments for an object.

22. The computer program product of claim 18, further including a fourth executable portion for, in conjunction with the creating the reference in the object-segment reference table between the object and the one of the plurality of segments, performing at least one of:

creating an entry in the object-segment reference table with the SID, the OID, and one of the plurality of reference types, traversing the segment-fragment reference table for the fragments referenced by the SID if there are no other alternative objects having the reference to the one of the plurality of reference types, wherein a bit is set in the reference type bitmap if the bit for the one of the plurality of reference types is reset, if the one of the plurality of reference types is the clone type reference, reserving the clone type capacity for each of the fragments that is referenced by the one of the plurality of segments, and if the one of the plurality of reference types is not the clone type reference, traversing over the fragments in entries of the segment-fragment reference table having the bit set for the one of the plurality of reference types, wherein if there are no other references from the one of the plurality of reference types, the one of the capacity types for the fragments is reserved if there are no other alternative one of the plurality of segments having the one of the plurality of reference types.

23. The computer program product of claim 18, further including a fourth executable portion for, in conjunction with deleting the reference in the object-segment reference table between the object and the one of the plurality of segments, performing at least one of:

finding an entry in the object-segment reference table which marks the reference of the OID to the SID, retrieving one of the plurality of reference types from the entry of the one of the plurality of reference types, deleting the entry in the object-segment reference table having the OID, the SID, and the one of the plurality of reference types, traversing the segment-fragment reference table for the fragments referenced by the SID if there are no other alternative objects having the reference to the one of the plurality of reference types, wherein a bit is reset in the reference type bitmap if the bit for the one of the plurality of reference types is set, if the one of the plurality of reference types is the clone type reference, redeeming the clone type capacity for each of the fragments that is referenced by the one of the plurality of segments, and if the one of the plurality of reference types is not the clone type reference, traversing over the fragments in entries of the segment-fragment reference table having the bit set for the one of the plurality of reference types, wherein if there are no other references from the one of the plurality of reference types, the one of the capacity types for the fragments is redeemed if there are no other alternative one of the plurality of segments having the one of the plurality of reference types, and for the entries in the segment-fragment reference table having bits in the reference type bitmap reset:

retrieving the FID, searching for alternative references to the FID, deleting the fragments that do not have any of the alternative references, and deleting the entries.

24. The computer program product of claim 18, further including a fourth executable portion for performing a clone operation for a plurality of objects by the following:

generating a first list of the OID that identify existing ones of the plurality of objects for which to perform the clone operation and a second list corresponding to destination object identifications for the plurality of objects that will become cloned objects, and for each of the plurality of objects, traversing references in the object-segment table, wherein the OID is the corresponding destination object ID and the plurality of reference types for each of the plurality of objects is indicated as the clone type reference.

* * * * *